A. A. PORTER.
Cotton Gin.
No. 85,128. Patented Dec. 22, 1868.
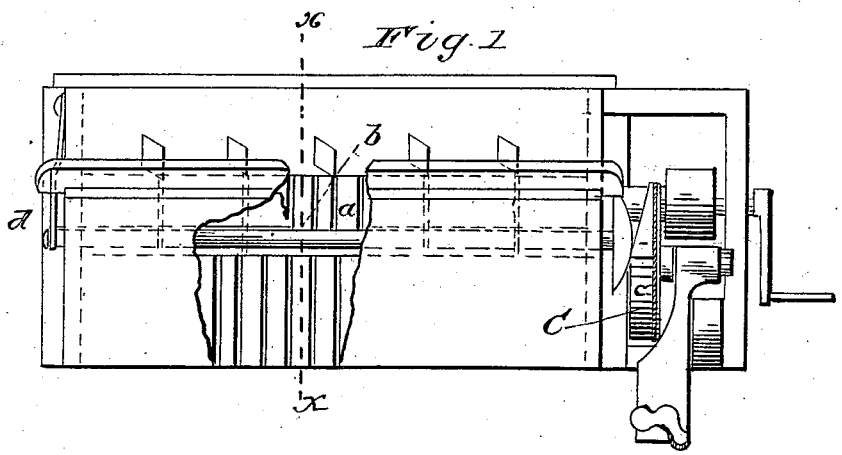
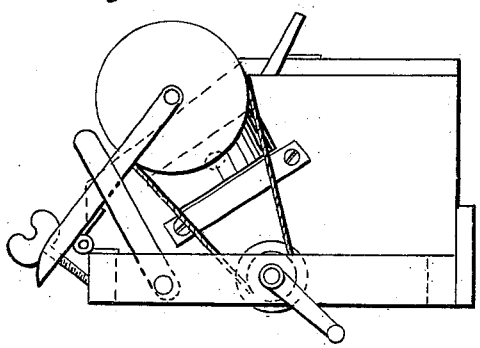 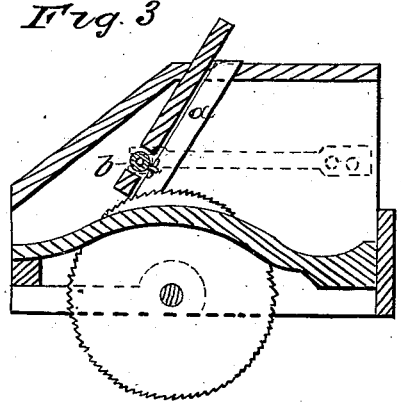
WITNESSES:
Joh. Becker
Wm a Morgan
INVENTOR.
A. A. Porter.
PER
Munn & Co
Attorneys

A. A. PORTER, OF GRIFFIN, GEORGIA.

Letters Patent No. 85,128, dated December 22, 1868.

IMPROVEMENT IN COTTON-GIN.

The Schedule referred to in these Letters Patent and making part of the same.

*To all whom it may concern:*

Be it known that I, A. A. PORTER, of Griffin, in the county of Spaulding, and State of Georgia, have invented a new and improved Cotton-Gin; and I do hereby declare that the following is a full, clear, and exact description thereof, which will enable others skilled in the art to make and use the same, reference being had to the accompanying drawings, forming part of this specification.

This invention relates to an improved arrangement of means for causing the cotton being fed into the gin to have a to-and-fro movement in a lateral direction, for bringing it more perfectly into contact with the saws, thereby more thoroughly separating the seed, and, at the same time, working the fibre more evenly.

In the accompanying drawings—

Figure 1 represents a plan view of a portion of a gin, having my improvement applied to it, with a part broken away;

Figure 2 represents an end elevation of the same; and

Figure 3 represents a sectional elevation, taken on the line *x x* of fig. 1.

Similar letters of reference indicate corresponding parts.

*a* represents a series of strips, of sheet-metal or other suitable substance, connected, by one end, to the top of the curb or shell of the breast of the gin, the other ends projecting downward to about the height of the top of the saws, and, a short distance above the lower ends, they are connected to a rod or bar, *b*, which is caused to have a to-and-fro motion, in the direction of its length, by the cam-wheel *c* and the spring *d*.

The said strips *a* are capable of springing, to allow the lower ends to move in unison with the rod *b*.

As the cotton is fed into the machine, the projecting lower ends of the strips will take into the mass sufficiently to give it a corresponding lateral movement, whereby all of it receives a uniform action from the saws, the seeds are more thoroughly separated, and the fibre much more evenly dressed, than is the case when the said lateral movement is not imparted to it, as will be readily seen.

Motion may be communicated to the cam-wheel *c* by a belt from a pulley on the saw-arbor, or by any other suitable means.

Having thus described my invention,

I claim as new, and desire to secure by Letters Patent—

The combination, with the saws of a cotton-gin, of the guiding-strips *a*, or their equivalent, and rod or bar *b*, arranged to have a vibrating motion imparted to them, substantially as and for the purpose described.

A. A. PORTER.

Witnesses:
J. N. HARRIS,
EDWIN SHEPHERD.